United States Patent
Li et al.

(10) Patent No.: US 12,412,275 B2
(45) Date of Patent: Sep. 9, 2025

(54) PATTERN MATCHING DEVICE, PATTERN MEASUREMENT SYSTEM, AND NON-TRANSITORY COMPUTER-READABLE MEDIUM

(71) Applicant: Hitachi High-Tech Corporation, Tokyo (JP)

(72) Inventors: Liang Li, Tokyo (JP); Yuichi Abe, Tokyo (JP); Wataru Nagatomo, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 326 days.

(21) Appl. No.: 17/800,155

(22) PCT Filed: Feb. 20, 2020

(86) PCT No.: PCT/JP2020/006688
§ 371 (c)(1),
(2) Date: Aug. 16, 2022

(87) PCT Pub. No.: WO2021/166142
PCT Pub. Date: Aug. 26, 2021

(65) Prior Publication Data
US 2023/0071668 A1    Mar. 9, 2023

(51) Int. Cl.
*G06T 7/12* (2017.01)
*G06V 10/44* (2022.01)
(Continued)

(52) U.S. Cl.
CPC ............... *G06T 7/12* (2017.01); *G06V 10/44* (2022.01); *G06V 10/60* (2022.01);
(Continued)

(58) Field of Classification Search
None
See application file for complete search history.

(56) References Cited

U.S. PATENT DOCUMENTS

| | | |
|---|---|---|
| 6,627,888 B2 | 9/2003 | Yamaguchi et al. |
| 7,235,782 B2 | 6/2007 | Takane et al. |

(Continued)

FOREIGN PATENT DOCUMENTS

| | | | |
|---|---|---|---|
| AU | 2004305781 A1 * | 4/2006 | ............... G06T 3/00 |
| JP | 11-175701 A | 7/1999 | |

(Continued)

OTHER PUBLICATIONS

International Search Report (PCT/ISA/210) issued in PCT Application No. PCT/JP2020/006688 dated Mar. 17, 2020 with English translation (five (5) pages).

(Continued)

*Primary Examiner* — Bernard Krasnic
(74) *Attorney, Agent, or Firm* — Crowell & Moring LLP (57) ABSTRACT

A pattern matching apparatus includes a computer system configured to execute pattern matching processing between first pattern data based on design data and second pattern data representing a captured image of an electron microscope. The computer system acquires a first edge candidate group including one or more first edge candidates, acquires a selection-required number (the number of second edge candidates to be selected based on the second pattern data), acquires a second edge candidate group including the second edge candidates of the selection-required number, acquires an association evaluation value for each of different association combinations between the first edge candidate group and the second edge candidate group, selects one of the combinations based on the association evaluation value, and calculates a matching shift amount based on the selected combination.

9 Claims, 6 Drawing Sheets

(51) Int. Cl.
*G06V 10/60* (2022.01)
*G06V 10/75* (2022.01)

(52) U.S. Cl.
CPC ........ *G06V 10/7515* (2022.01); *G06V 10/757* (2022.01); *G06T 2207/10061* (2013.01)

(56) References Cited

U.S. PATENT DOCUMENTS

| | | |
|---|---|---|
| 2007/0188771 A1 | 8/2007 | Liu et al. |
| 2008/0069452 A1 | 3/2008 | Matsumoto |
| 2008/0073528 A1* | 3/2008 | Sasaki .................... H01J 37/28 250/307 |
| 2009/0226096 A1 | 9/2009 | Namai et al. |
| 2014/0023265 A1 | 1/2014 | Kitazawa et al. |
| 2014/0312224 A1 | 10/2014 | Murakawa et al. |
| 2014/0353498 A1 | 12/2014 | Shur |
| 2017/0040230 A1 | 2/2017 | Yamaguchi et al. |
| 2018/0005363 A1 | 1/2018 | Nagatomo et al. |

FOREIGN PATENT DOCUMENTS

| | | |
|---|---|---|
| JP | 4199939 B2 | 12/2008 |
| JP | 4218171 B2 | 2/2009 |
| JP | 2009-211960 A | 9/2009 |
| JP | 2014-211313 A | 11/2014 |
| JP | 2018-128702 A | 8/2018 |
| TW | I292031 B | 1/2008 |
| TW | I344188 B | 6/2011 |
| TW | I529369 B | 4/2016 |
| WO | WO 2016/121073 A1 | 8/2016 |

OTHER PUBLICATIONS

Japanese-language Written Opinion (PCT/ISA/237) issued in PCT Application No. PCT/JP2020/006688 dated Mar. 17, 2020 (three (3) pages).

Taiwanese-language Office Action issued in Taiwanese Application No. 109144853 dated Aug. 6, 2021 (three (3) pages).

* cited by examiner

PATTERN MATCHING DEVICE, PATTERN MEASUREMENT SYSTEM, AND NON-TRANSITORY COMPUTER-READABLE MEDIUM

CROSS REFERENCE TO RELATED APPLICATIONS

This application is a 35 U.S.C. § 371 National Stage Application of PCT International Application No. PCT/JP2020/006688 filed on Feb. 20, 2020, the disclosure and content of which is incorporated herein by reference in its entirety.

TECHNICAL FIELD

The present disclosure relates to a pattern matching apparatus, a pattern measuring system, and a non-transitory computer-readable medium, and more particularly to a pattern matching apparatus, a pattern measuring system, and a non-transitory computer-readable medium that implement highly accurate matching processing even when an edge signal of a pattern is weak.

BACKGROUND ART

In an apparatus for measuring and inspecting a pattern formed on a semiconductor wafer, a template matching technique is often used to perform desired measurement or adjust a field of view of an inspection apparatus to a measurement position. PTL 1 describes an example of such template matching. The template matching is processing of finding a region that most matches a template image registered in advance from an image to be searched for.

PTL 2 describes a method of creating a template for template matching based on design data of a semiconductor device. There is an advantage that it is not necessary to acquire an image by an inspection apparatus in order to create the template as long as the template can be created based on the design data.

PTL 3 describes a method of performing highly accurate matching between a template and an image to be searched for even when there is a change in positions or the number of edges (such as an end portion of a layer, a boundary between layers) included in a pattern.

CITATION LIST

Patent Literature

PTL 1: Japanese Patent No. 4218171 (corresponding U.S. Pat. No. 6,627,888)
PTL 2: Japanese Patent No. 4199939 (corresponding U.S. Pat. No. 7,235,782)
PTL 3: Pamphlet of WO2016/121073

SUMMARY OF INVENTION

Technical Problem

In recent years, due to a progress of semiconductor processes, a case in which an edge is weak in an image (SEM image) captured by a scanning electron microscope (SEM) has increased. In particular, this tendency is remarkable in a multilayer pattern. Pattern matching processing using the weak edge is required.

However, in the related art, it is difficult to accurately acquire the weak edge from the SEM image.

For example, PTL 3 describes a method of selecting an edge candidate based on a threshold using an edge intensity, but an appearance of an SEM image is different from design data due to a difference in a configuration, a material, a structure, or the like of a semiconductor pattern, a difference in measurement conditions, or the like, and thus, it is not possible to predict how weak the edge intensity of the weak edge will be. When selection of the edge is performed using threshold processing, a true edge (correct edge) may be failed to be extracted. Conversely, when all the edge candidates are selected without using the threshold processing, a processing time of association processing at a subsequent stage may become long. In addition, the matching processing may become unstable due to an increase in a degree of freedom of the association processing.

As described above, in an SEM image including a weak pattern edge, appropriate matching may not be performed, which may affect measurement and inspection after the matching processing.

PTLs 1, 2, and 3 do not describe how to perform edge selection processing in an SEM image including a weak edge.

The present disclosure has been made to solve such a problem, and proposes a pattern matching apparatus, a pattern measuring system, and a non-transitory computer-readable medium capable of appropriately selecting edge candidates even in an SEM image including a weak edge and performing highly accurate positioning.

Solution to Problem

An example of a pattern matching apparatus according to the present disclosure is a pattern matching apparatus including a computer system configured to execute pattern matching processing between first pattern data based on design data and second pattern data representing a captured image of an electron microscope.

The computer system acquires a first edge candidate group including one or more first edge candidates based on the first pattern data.

The computer system acquires a selection-required number, and the selection-required number represents the number of second edge candidates to be selected based on the second pattern data.

The computer system acquires a second edge candidate group including the second edge candidates of the selection-required number based on the second pattern data.

The computer system acquires an association evaluation value based on the first and second edge candidate groups for each of different association combinations between the first edge candidate group and the second edge candidate group.

The computer system selects one of the combinations based on the association evaluation value.

The computer system calculates a matching shift amount based on the selected combination.

An example of a pattern measuring system according to the present disclosure includes the above pattern matching apparatus, and a scanning electron microscope.

In an example of a non-transitory computer-readable medium according to the present disclosure, a program instruction causes a computer system to function as the computer system included in the pattern matching apparatus according to claim 1, and is to be executed on the computer system.

Advantageous Effects of Invention

According to the pattern matching apparatus, the pattern measuring system and the non-transitory computer-readable medium of the present disclosure, it is possible to appropriately select edge candidates even in an SEM image including weak edges and perform highly accurate positioning.

DESCRIPTION OF EMBODIMENTS

Hereinafter, a pattern matching apparatus, a pattern measuring system, and a non-transitory computer-readable medium according to the present disclosure will be described with reference to the drawings. In the drawings, the same components are denoted by the same reference numerals.

First Embodiment

Figure 1:
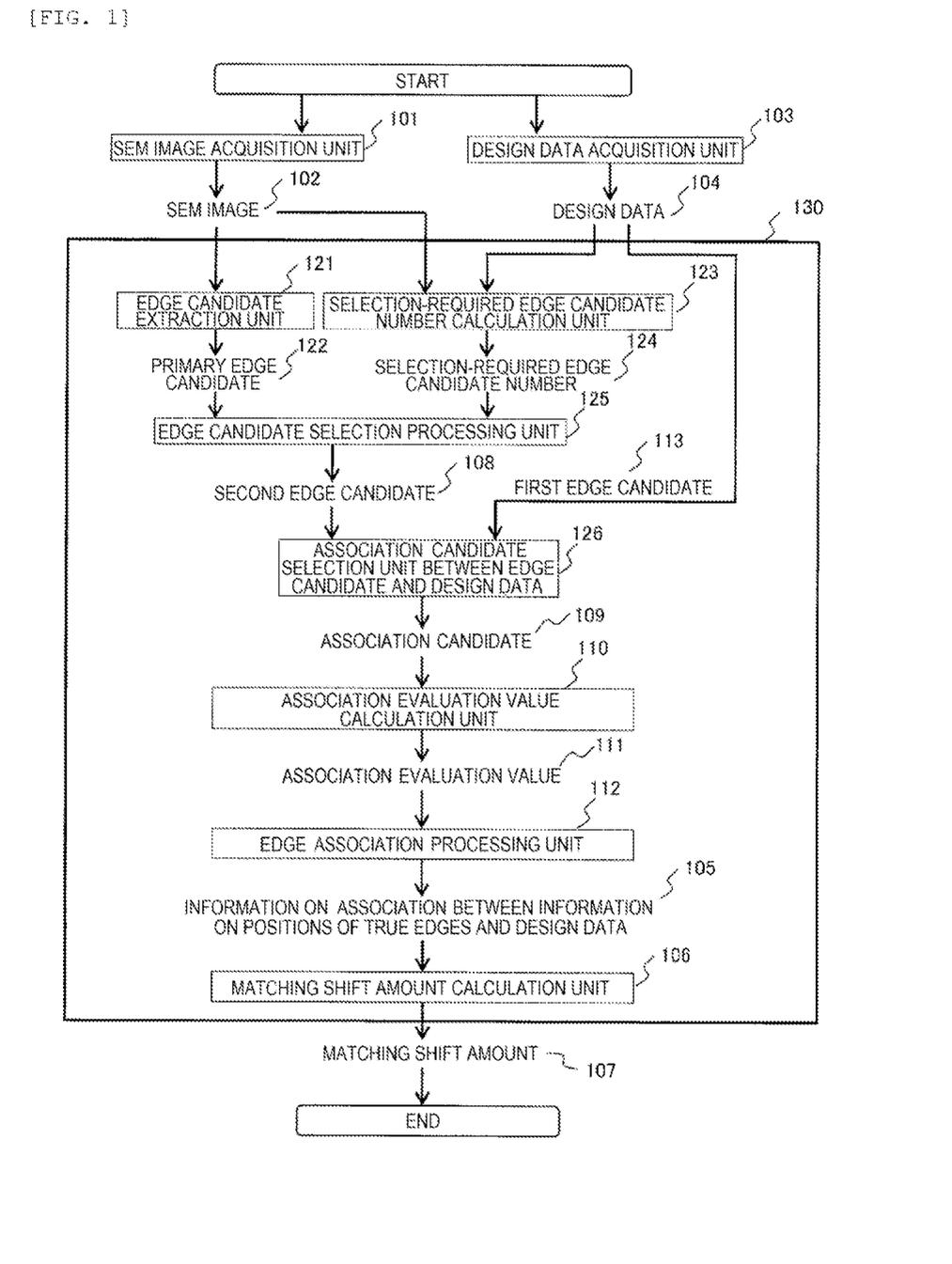
FIG. 1 shows a configuration example of a pattern matching apparatus according to a first embodiment of the present disclosure.

FIG. 1 shows a configuration example of a pattern matching apparatus according to a first embodiment of the present disclosure. The pattern matching apparatus can be implemented as a calculation processing device that executes pattern matching processing. The calculation processing device can be implemented by, for example, a computer system.

FIG. 1 particularly shows a flow of the pattern matching processing executed by the calculation processing device. The pattern matching processing includes, for example, a step of searching for an appropriate association between an edge candidate obtained based on an image acquired by a measurement device and an edge candidate obtained based on design data.

In the present embodiment, a scanning electron microscope (hereinafter referred to as "SEM") is used as an example of the measurement device. The SEM is used, for example, to measure a dimension of a pattern of a semiconductor device formed on a semiconductor wafer. A specific configuration example of the SEM will be described later with reference to FIG. 4.

In the present embodiment, the calculation processing device includes an SEM image acquisition unit 101, a design data acquisition unit 103, and a pattern matching processing unit 130. The pattern matching processing unit 130 can be implemented as, for example, a computer system.

The design data acquisition unit 103 acquires design data 104 (first pattern data) and supplies the design data 104 to the pattern matching processing unit 130. In the present embodiment, the design data 104 itself is the first pattern data, and the first pattern data can be data in any format and having any content as long as the data is obtained based on the design data 104.

The SEM image acquisition unit 101 acquires an SEM image 102 (second pattern data) and supplies the SEM image 102 to the pattern matching processing unit 130. Instead of the SEM image 102, a captured image of an electron microscope of another system may be used.

The design data 104 corresponds to a pattern appearing in the SEM image 102. For example, a pattern of a semiconductor device is formed based on the certain design data 104, and the SEM image 102 is obtained by the SEM imaging the pattern. The design data 104 corresponding to each of the various SEM images 102 is prepared in advance and supplied to the calculation processing device.

An association between the SEM image 102 and the design data 104 can be determined by any method, and for example, the appropriate design data 104 may be automatically acquired by the calculation processing device in accordance with the SEM image 102, or the design data 104 may be designated by a user of the calculation processing device in accordance with the SEM image 102.

A plurality of edges appear in the SEM image 102. For example, the edge is an end portion of a layer, a boundary between layers, or the like in a pattern representing a physical structure. The edges in the SEM image 102 have, for example, a line-segment shaped structure in which the edges extend in parallel to each other in a predetermined direction (longitudinal direction as a specific example).

Similarly, a plurality of edges also appear in the design data 104. The design data 104 includes, for example, coordinate data representing a start point and an end point of a line segment representing the edge. In the present embodiment, the edges in the design data 104 are represented by line segments extending in parallel to each other in a predetermined direction (longitudinal direction as a specific example).

In the present embodiment, a position of each of the edges in the SEM image 102 and the design data 104 can be represented by a single scalar value (for example, an X coordinate value). When the positions of the edges represented in this manner are used, the edges on the image can be used for specific information processing.

The pattern matching processing unit 130 executes the pattern matching processing between the SEM image 102 and the design data 104. As a result of the pattern matching processing, a matching shift amount 107 is output. The matching shift amount 107 represents a shift amount of positions between the SEM image 102 and the design data 104 or a difference in the positions between the SEM image 102 and the design data 104.

The matching shift amount 107 can be represented by, for example, a single scalar value (for example, a shift amount in an X direction).

Ideally, when all the edges included in the design data 104 are shifted by the same shift amount, the edges included in the design data 104 completely match the edges included in the SEM image 102. In reality, the edges that do not correspond to each other may exist, and a certain degree of error may occur in the shift amount, but it is possible to determine the matching shift amount 107 as the optimal shift amount that provides an optimal association between the edges.

Hereinafter, a configuration and operations of the pattern matching processing unit 130 will be described. The pattern matching processing unit 130 includes an edge candidate extraction unit 121, a selection-required edge candidate number calculation unit 123, an edge candidate selection processing unit 125, an association-candidate-between-edge-candidate-and-design data selection unit 126 (hereinafter, referred to as an "association candidate selection unit 126"), an association evaluation value calculation unit 110, an edge association processing unit 112, and a matching shift amount calculation unit 106.

First, the selection-required edge candidate number calculation unit 123 acquires a selection-required edge candidate number 124. The selection-required edge candidate number 124 is a number equal to or larger than the number of edges included in the design data 104.

A method by which the selection-required edge candidate number calculation unit 123 acquires the selection-required edge candidate number 124 can be freely designed. For example, as shown in FIG. 1, the selection-required edge candidate number calculation unit 123 may automatically perform calculation based on the SEM image 102 and the design data 104 (a specific example will be described later with reference to FIG. 3 and the like). Alternatively, the user may input an appropriate number according to the design data 104, and the selection-required edge candidate number calculation unit 123 may acquire the appropriate number.

Next, the edge candidate extraction unit 121 acquires primary edge candidates 122 based on the SEM image 102. The number of primary edge candidates 122 acquired here is equal to or larger than the selection-required edge candidate number 124.

Figure 2A:
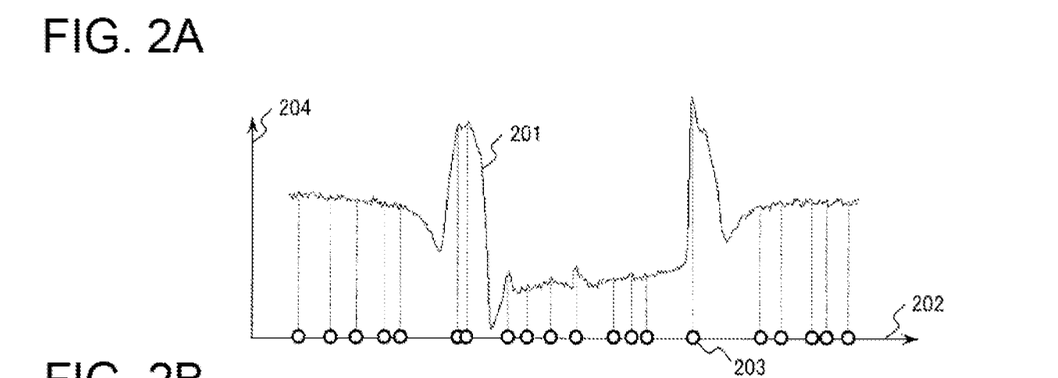
FIGS. 2A to 2D show an example of processing related to an edge.

An example of processing related to the edge will be described with reference to FIG. 2. (a) of FIG. 2 is a graph related to processing of extracting the primary edge candidates 122. A horizontal axis 202 represents a coordinate (for example, an X coordinate) in a specific direction in the SEM image 102, and a vertical axis 204 represents a signal intensity (for example, luminance). A line profile 201 is a profile generated by projecting the signal intensity of each pixel of the SEM image 102 in a direction (for example, a Y-axis direction corresponding to a longitudinal direction of a line pattern) orthogonal to the horizontal axis 202 in the SEM image 102.

A point 203 extracted based on the line profile 201 is a primary edge candidate. In an example of (a) of FIG. 2, 20 primary edge candidates are acquired.

As a method of extracting the primary edge candidate, for example, in the line profile 201, a position at which the signal intensity is a maximum value in a section having a width of a predetermined pixel number can be extracted as the primary edge candidate. The processing of extracting the primary edge candidates is not limited to the above-described method, and may be any processing that can appropriately extract a position that may be an edge.

In this processing, in order to more reliably extract a weak edge, it is preferable not to perform elimination processing based on a threshold or elimination processing of a false edge caused by noise.

The selection-required edge candidate number 124 represents the number of second edge candidates 108 to be selected based on the SEM image 102, and is a number determined so as not to fail to extract a true edge in the SEM image 102. By appropriately determining the selection-required edge candidate number 124, the number of edge candidates to be calculated can be minimized. When such processing is used, effects of reducing association candidates 109 (candidates to be subjected to discrete optimization processing to be described later), shortening a time required for the pattern matching processing, and stabilizing the processing are obtained.

Next, the edge candidate selection processing unit 125 selects a plurality of second edge candidates 108 to be actually associated with the edges of the design data 104 from the primary edge candidates in the SEM image 102.

For example, the edge candidate selection processing unit 125 calculates an edge evaluation value for each of the primary edge candidates, and selects the second edge candidates 108 based on the edge evaluation values. The number of second edge candidates 108 selected here is equal to the selection-required edge candidate number 124.

(b) of FIG. 2 is a graph related to processing of selecting the second edge candidate 108. A horizontal axis 222 is the same as (a) of FIG. 2, and a vertical axis 221 represents the edge evaluation value. Hereinafter, as an example of the edge evaluation value, an edge intensity indicating an intensity of an edge is used.

Figure 2B:
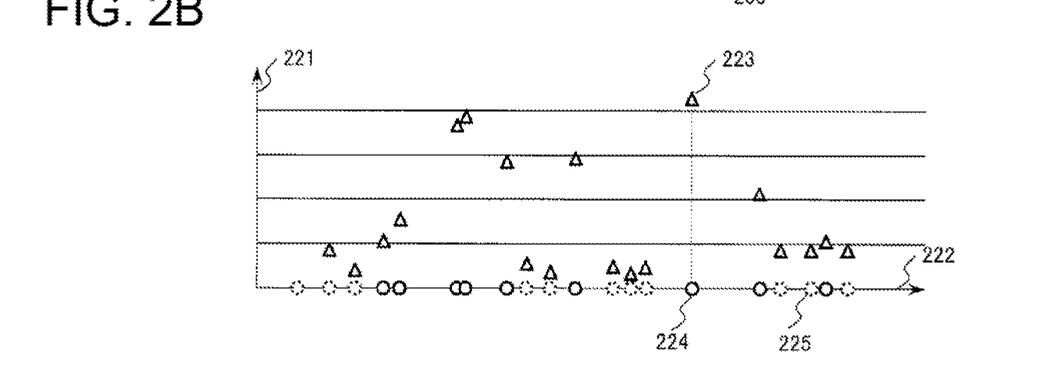

First, the edge candidate selection processing unit 125 calculates the edge intensity for each of the primary edge candidates. For example, an edge intensity value of a certain primary edge candidate 224 is denoted by 223, which is the primary edge candidate having a highest edge intensity in the example of (b) of FIG. 2.

As a method of calculating the edge intensity, for example, in the line profile 201 of (a) of FIG. 2, it is possible to calculate a difference between a signal intensity corresponding to the primary edge candidate and a minimum value (local minimum value) of the signal intensity around the primary edge candidate (for example, in the section having the width of the predetermined pixel number before and after a position of the primary edge candidate as a center).

As another example, in the line profile 201 of (a) of FIG. 2, the edge intensity can be calculated based on a slope (differential value) around the primary edge candidate.

In this manner, by calculating the edge intensity based on luminance in the SEM image 102 or based on a waveform of a signal representing luminance at each position in the SEM image 102, the edge intensity can be acquired with a relatively small amount of calculation.

The method of calculating the edge intensity is not limited thereto, and any method may be used as long as the method uses an index value providing a high value for the edge in the SEM image 102.

Next, the edge candidate selection processing unit 125 ranks the primary edge candidates based on the edge intensities. As a specific example of ranking, the primary edge candidates can be ranked in descending order of the edge intensities. For example, when the edge intensity value 223 of the certain primary edge candidate 224 is the highest among the edge intensities of all the primary edge candidates, the primary edge candidate 224 having the highest edge intensity value 223 is ranked first.

In the above example, it is assumed a case in which the larger the edge intensity is, the higher a possibility that the edge is the true edge, and conversely, in a case in which the smaller the edge intensity is, the higher the possibility that the edge is the true edge is, the ranking may be performed in ascending order of the edge intensities.

From the primary edge candidates ranked in this manner, only the primary edge candidates whose number is equal to the selection-required edge candidate number 124 are selected according to the ranking. The selected edge candidates are candidates (second edge candidates 108) that actually correspond to the edges of the design data 104.

In the example of (b) of FIG. 2, the certain primary edge candidate 224 is selected as the second edge candidates (indicated by solid lines), and another edge candidate 225 is not selected (indicated by a broken line). (c) of FIG. 2 shows a second edge candidate group including the selected second edge candidates 108.

In this manner, the pattern matching processing unit 130 determines a position of each of the second edge candidates 108 based on the SEM image 102, thereby acquiring the second edge candidate group including the second edge candidates 108 of the selection-required edge candidate number 124.

Next, the association candidate selection unit 126 acquires a first edge candidate group including one or more first edge candidates 113 based on the design data 104.

(d) of FIG. 2 is a graph related to the processing of selecting the first edge candidate. A shape 261 schematically represents unevenness appearing on a cross section of the pattern corresponding to the design data 104. This cross section is parallel to an axis 262. The axis 262 indicates positions of the first edge candidates corresponding to the layer shape 261, and is, for example, an axis in a direction corresponding to the horizontal axis 202 of (a) of FIG. 2.

A pattern of (d) of FIG. 2 is a pattern having an upper layer and a lower layer. An upper layer line 263, an upper layer space 264 (or a lower layer line), and a lower layer space 265 are shown. Boundaries thereof are the edges (first edge candidates) of the design data 104. For example, an edge 266 at the boundary between the upper layer line 263 and the upper layer space 264 is an upper layer edge, and an edge 267 at the boundary between the upper layer space 264 (that is, the lower layer line) and the lower layer space 265 is a lower layer edge.

Figure 2C:
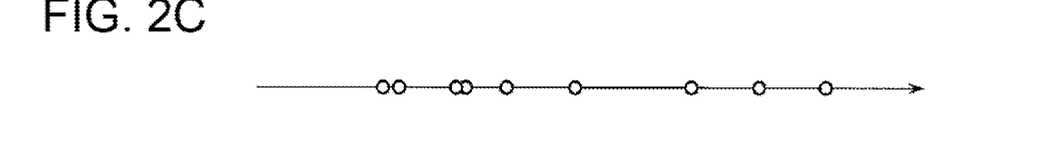
Figure 2D:
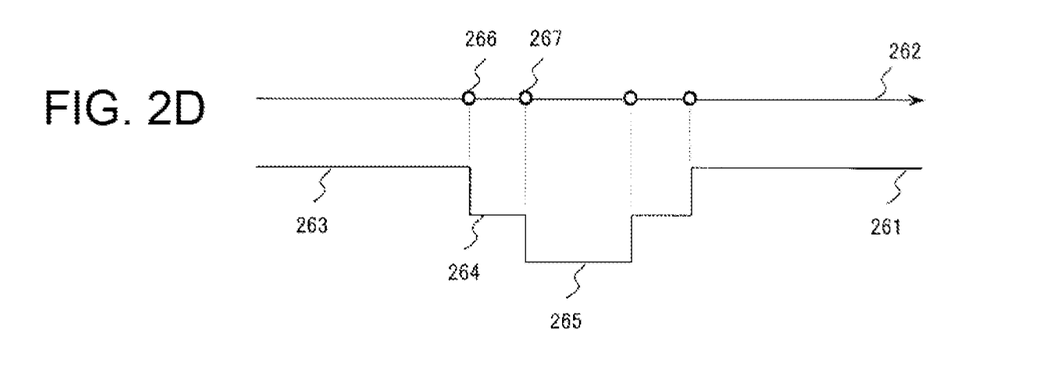

As described above, the design data 104 includes information representing the position of the first edge candidate. As described above, in the present embodiment, the design data 104 includes, for example, the coordinate data representing the start point and the end point of the line segment representing each edge, and thus the position of the first edge candidate can be acquired based on the coordinate data.

In the example of (d) of FIG. 2, two upper layer edges and two lower layer edges are shown. In this manner, the first edge candidate group including four first edge candidates is acquired. In the present embodiment, all of the selected first edge candidates are targets of association processing with the second edge candidates.

Next, the association candidate selection unit 126 generates an association candidate 109 representing different association combinations between the first edge candidate group and the second edge candidate group. In the example of FIG. 2, the association candidate selection unit 126 generates association relationship combinations between the four first edge candidates shown in (d) of FIG. 2 and the nine second edge candidates shown in (c) of FIG. 2. In the present embodiment, the association candidate 109 includes all logically possible association combinations.

The "association relationship combination" refers to, for example, a combination in a case in which each of the second edge candidates included in the second edge candidate group is associated with any one of the first edge candidates included in the first edge candidate group (or is not associated with any one of the first edge candidates). For example, in a certain combination, a certain second edge candidate is associated with a certain first edge candidate, and in another combination, the second edge candidate is associated with another first edge candidate.

The association evaluation value calculation unit 110 acquires an association evaluation value 111 based on the first and second edge candidate groups for each of the association combinations. The association evaluation value 111 represents a likelihood of the association in the association combinations, and can be expressed as, for example, a cost.

The association evaluation value 111 can be calculated by, for example, the discrete optimization processing. As a specific example, a graph cut described in Patent Literature 3 may be used. When the association evaluation value 111 is calculated, an evaluation value correlated with the edge intensity in the SEM image 102 may be used, or an evaluation value of a relative deviation between the edge (second edge candidate) in the SEM image 102 and the edge (first edge candidate) in the design data may be used.

In the discrete optimization processing, the second edge candidate that is considered to be erroneously selected may be excluded from processing targets as the second edge candidate not corresponding to any of the first edge candidates. In this manner, by reducing the number of second edge candidates as the processing targets, the number of candidates of the association combinations is reduced, and the discrete optimization processing is speeded up or stabilized.

Next, the edge association processing unit 112 determines an appropriate association combination based on the association evaluation value 111. For example, an association combination having a largest association evaluation value 111 is selected from the association combinations. As a result, association information 105 between information on a position of the true edge and the design data is acquired.

Next, the matching shift amount calculation unit 106 calculates the matching shift amount 107 based on the selected association combination. As a calculation method of the matching shift amount 107, for example, for a pair of the first edge candidate and the second edge candidate constituting the association, a deviation amount of coordinates of the first edge candidate and the second edge candidate is calculated, and the deviation amount can be obtained as an average value for all pairs. However, the calculation method of the matching shift amount is not limited thereto, and any appropriate method can be used.

As described above, according to the pattern matching apparatus of the present disclosure, it is possible to appropriately select edge candidates even in an SEM image including weak edges and perform highly accurate positioning.

In particular, by using the selection-required edge candidate number 124, it is possible to minimize the number of edge candidates (second edge candidates) extracted from the SEM image 102 while eliminating a failure in extracting the weak edges. Therefore, the effects of reducing the association candidates 109, shortening the time required for the pattern matching processing, and stabilizing the processing are obtained.

Hereinafter, an example of specific processing when the selection-required edge candidate number calculation unit 123 acquires the selection-required edge candidate number 124 will be described. The selection-required edge candidate number can be obtained by using an edge number included in the design data 104.

In a first method for acquiring the selection-required edge candidate number, a database including a table in which the selection-required edge candidate number is associated with each edge number of the design data is used. The association is defined, for example, such that when the edge number of the design data is X1, the selection-required edge candidate number is Y1, and when the edge number of the design data is X2, the selection-required edge candidate number is Y2.

Such a database can be created by any method, and an example will be described below. First, several SEM images serving as models are prepared for each edge number of the design data. In each of the SEM images, the primary edge candidates are extracted by the same processing as that of the edge candidate extraction unit 121, and the edge intensity of each of the primary edge candidates is calculated. The number of selected edges in which the true edges are not failed to be extracted is recorded in an order of the edge intensity (for example, an order of a primary edge candidate having a smallest edge intensity among the primary edge candidates corresponding to the true edges is acquired, and the order is set as the number of selected edges). In this manner, the number of selected edges is recorded for each of the SEM images, and a maximum value thereof is set as the selection-required edge candidate number corresponding to the edge number of the design data.

Figure 3:
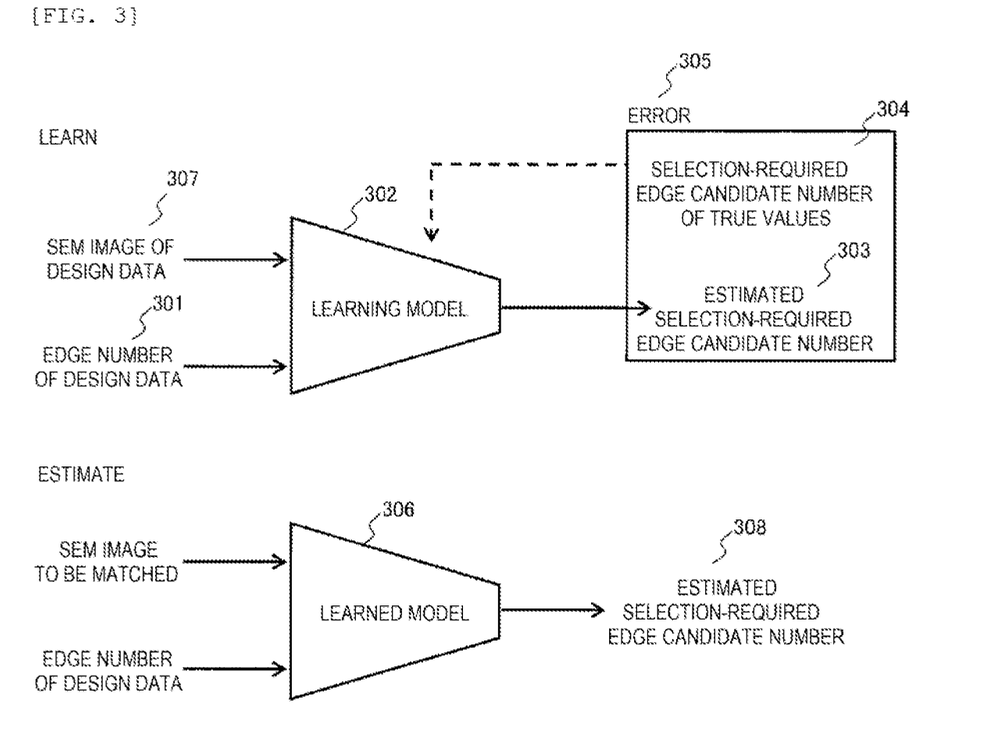
FIG. 3 shows an example of a method of using machine learning to acquire a selection-required edge candidate number.

In a second method for acquiring the selection-required edge candidate number, machine learning is used. FIG. 3 shows an example of such a method. In this example, the calculation processing device includes a learned model.

Training data used in a learning stage includes an SEM image 307 of design data, an edge number 301 (that is, the number of first edge candidates) of the design data, and a selection-required edge candidate number 304 of true values. A learned model 306 is generated by a learning model 302 performing learning using such training data.

The SEM image 307 of the design data is a captured image of an electron microscope corresponding to the design data, for example, a pattern of a semiconductor device is formed based on certain design data, and an image obtained by the SEM capturing the formed pattern can be used.

The edge number 301 of the design data can be automatically acquired based on, for example, the design data, and may be prepared independently of the design data. In addition, other data capable of estimating the edge number of the design data may be used.

The selection-required edge candidate number 304 of the true values can be determined and designated by, for example, the user. For example, the user can determine the selection-required edge candidate number 304 of the true values in consideration of an image quality (contrast, noise, or the like) of the SEM image 307 of the design data. In this manner, the calculation processing device can determine the selection-required edge candidate number in consideration of the image quality of the SEM image. A method of obtaining the selection-required edge candidate number 304 of the true values is not limited to such a method, and other methods may be used.

In the learning stage, first, a plurality of sets of the training data as described above are prepared. Next, the learning model 302, in which the edge number 301 of the design data and the SEM image 307 of the design data are inputs and an estimated selection-required edge candidate number 303 is an output, is constructed. The learning model 302 obtains an error 305 between the estimated selection-required edge candidate number 303 and the selection-required edge candidate number 304 of the corresponding true values, and performs the learning so as to reduce the error.

After the learning is completed, the edge number of the design data and the SEM image (corresponding to the SEM image 102 of FIG. 1) to be matched are input using the learned model 306, and an estimated selection-required edge candidate number 308 is output. That is, the learned model 306 receives inputs of the SEM image (second pattern data) to be matched and the edge number (the number of first edge candidates) of the design data, and outputs the estimated selection-required edge candidate number 308.

By performing the learning in this manner, it is possible to generate the learned model 306 that outputs the selection-required edge candidate number 308 appropriately estimated with high accuracy. For example, it is possible to select the required number of edges in which the true edges are not failed to be extracted, and an appropriate association can be performed even in an SEM image including weak edges.

Figure 5:
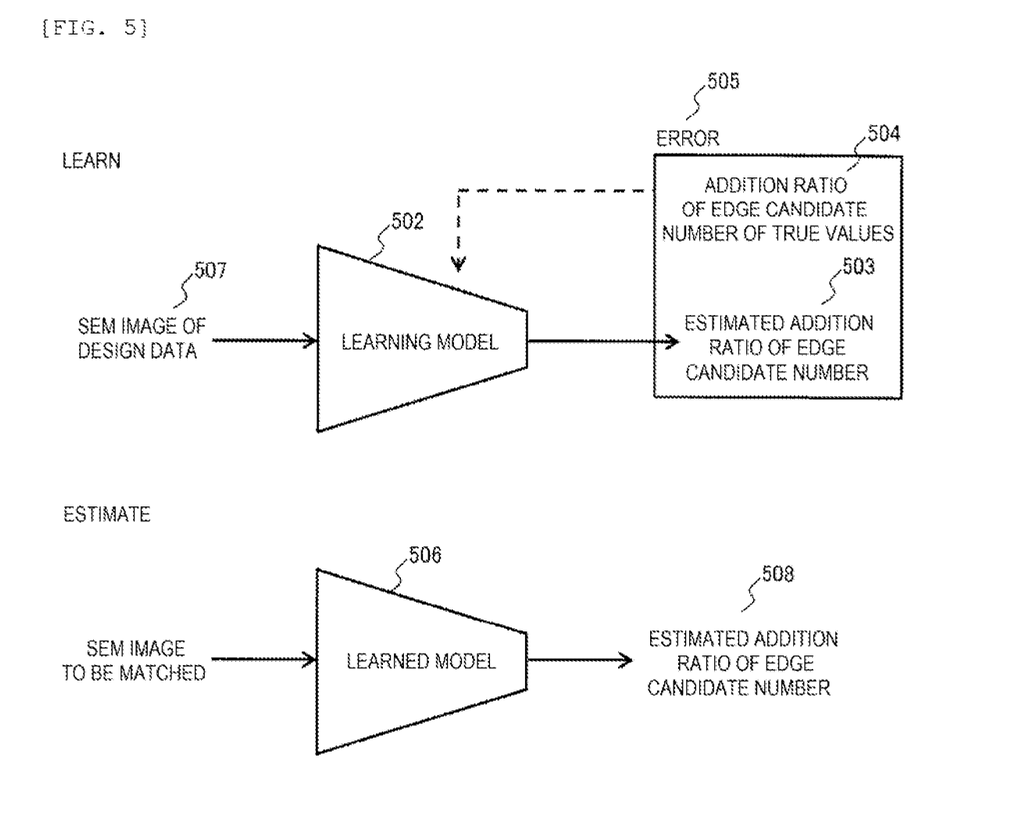
FIG. 5 shows another example of the method of using the machine learning to acquire the selection-required edge candidate number.

In a third method for acquiring the selection-required edge candidate number, the machine learning is also used. FIG. 5 shows an example of such a method. In this example, the calculation processing device also includes the learned model.

The training data used in the learning stage includes an SEM image 507 of the design data and an addition ratio 504 of an edge candidate number of true values. A learned model 506 is generated by a learning model 502 performing learning using such training data.

The addition ratio 504 of the edge candidate number of the true values is a value representing a relationship between the edge number (the number of first edge candidates) of the design data and the selection-required edge candidate number. For example, a ratio of the selection-required edge candidate number to the edge number of the design data can be used. As a modification, this value may be a difference between the edge number of the design data and the selection-required edge candidate number, or may be another value representing the relationship between the edge number of the design data and the selection-required edge candidate number.

The addition ratio 504 of the edge candidate number of the true values can be determined and designated by, for example, a user. For example, the user can determine the addition ratio 504 of the edge candidate number of the true values in consideration of image quality (contrast, noise, or the like) of the SEM image 507 of the design data. In this manner, the calculation processing device can determine the selection-required edge candidate number in consideration of the image quality of the SEM image. A method of obtaining the addition ratio 504 of the edge candidate number of the true values is not limited to such a method, and other methods may be used.

In the learning stage, first, a plurality of sets of training data as described above are prepared. Next, the learning model 502, in which the SEM image 507 of the design data is an input and an estimated addition ratio 503 of the edge candidate number is an output, is constructed. The learning model 502 obtains an error 505 between the estimated addition ratio 503 of the edge candidate number and the addition ratio 504 of the edge candidate number of the corresponding true values, and performs learning so as to reduce the error.

After the learning is completed, the SEM image (corresponding to the SEM image 102 of FIG. 1) to be matched is input using the learned model 506, and an estimated addition ratio 508 of the edge candidate number is output. That is, the learned model 506 receives an input of the SEM image (second pattern data) to be matched, and outputs the estimated addition ratio 508 (that is, a value representing a relationship between the number of first edge candidates and the selection-required edge candidate number) of the edge candidate number.

By performing the learning in this manner, it is possible to generate the learned model 506 that outputs the addition ratio 508 of the edge candidate number appropriately estimated with high accuracy. For example, it is possible to select the required number of edges in which the true edges are not failed to be extracted, and an appropriate association can be performed even in an SEM image including weak edges.

Figure 4:
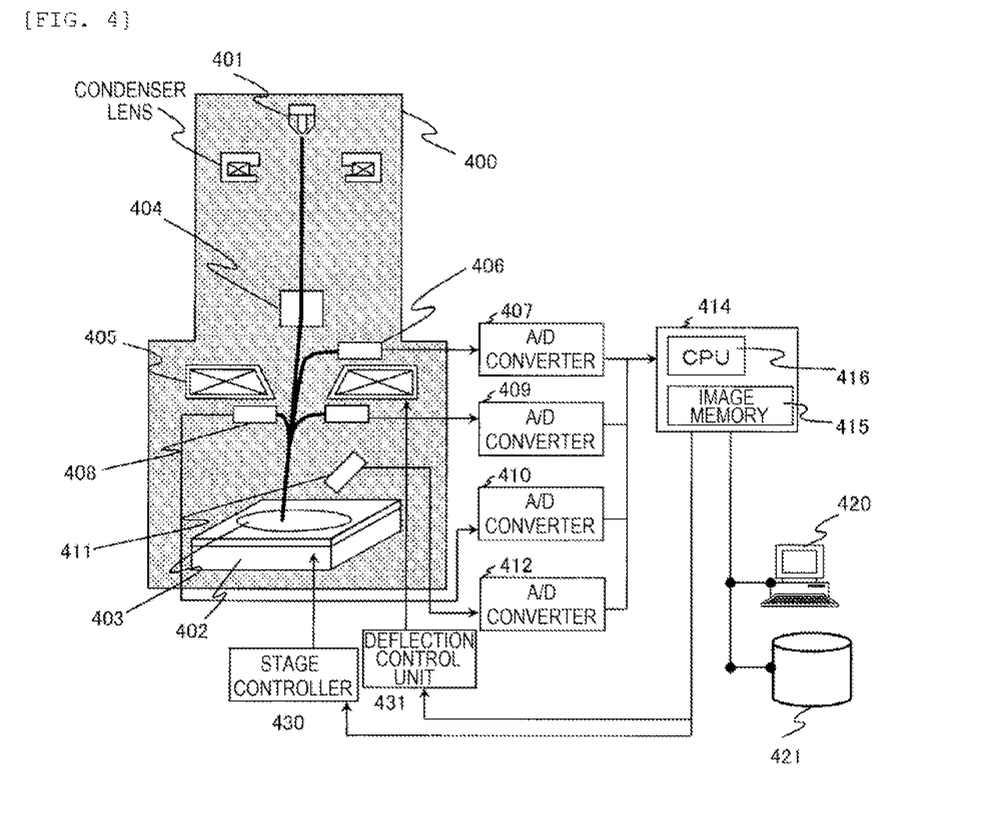
FIG. 4 shows a configuration example of a pattern measuring system including the pattern matching apparatus of FIG. 1 and a scanning electron microscope.

FIG. 4 is a configuration example of a pattern measuring system including the pattern matching apparatus of FIG. 1 and an SEM 400. The SEM 400 can be used for, for example, measuring a dimension of a pattern of a semiconductor device formed on a semiconductor wafer 403. The calculation processing device or the computer system in the pattern measuring system can be implemented as, for example, a processing/control unit 414.

The processing/control unit 414 includes a calculation unit (for example, a CPU 416) and a storage unit (for example, a memory including an image memory 415). Information can be stored in the storage unit, and, for example, a program related to the pattern matching processing is stored. The storage unit may include a non-transitory computer-readable medium, and the program may be stored in the non-transitory computer-readable medium as a program instruction executable on the computer system.

When the CPU 416 executes this program, the pattern matching processing shown in FIG. 1 is executed, that is, the processing/control unit 414 functions as the pattern matching apparatus. In other words, the program causes the computer system to function as the calculation processing device included in the pattern matching apparatus, and to execute the pattern matching processing shown in FIG. 1.

The SEM 400 generates an electron beam from an electron gun 401. A deflector 404 and an objective lens 405 are controlled such that the electron beam is focused and emitted at any position on the semiconductor wafer 403 serving as a sample placed on a stage 402.

Secondary electrons are emitted from the semiconductor wafer 403 irradiated with the electron beam and detected by a secondary electron detector 406. The detected secondary electrons are converted into a digital signal by an A/D converter 407. An image represented by the digital signal is stored in the image memory 415 in the processing/control unit 414.

This image is used as, for example, the SEM image 102, and based on this image, the pattern matching processing shown in FIG. 1 and the learning processing shown in FIGS. 3 and 5 are performed by the processing/control unit 414 or the CPU 416.

Setting processing required for these processing and display of processing results can be performed on a display device 420.

In alignment using an optical camera having a magnification lower than that of the SEM, an optical camera 411 may be used. A signal obtained by the optical camera 411 capturing the semiconductor wafer 403 is also converted into a digital signal by the A/D converter 412 (when the signal from the optical camera 411 is a digital signal, the A/D converter 412 is unnecessary), an image represented by the digital signal is stored in the image memory 415 in the processing/control unit 414, and image processing depending on applications is performed by the CPU 416.

The SEM 400 may include a backscattered electron detector 408. When the backscattered electron detector 408 is provided, backscattered electrons emitted from the semiconductor wafer 403 are detected by the backscattered electron detector 408, and the detected backscattered electrons are converted into a digital signal by an A/D converter 409 or 410. An image represented by the digital signal is stored in the image memory 415 in the processing/control unit 414, and the image processing depending on applications is performed by the CPU 416.

A storage unit 421 may be provided separately from the image memory 415. The processing/control unit 414 may control the stage 402 via a stage controller 430 or may control the objective lens 405 and the like via a deflection control unit 431.

In the example of FIG. 4, the SEM 400 is shown as an example of an inspection device used together with the pattern matching apparatus, and a device that can be used together with the pattern matching apparatus is not limited thereto. Any device (a measurement device, an inspection device, or the like) that acquires an image and performs the pattern matching processing can be used together with the pattern matching apparatus.

Figure 6:
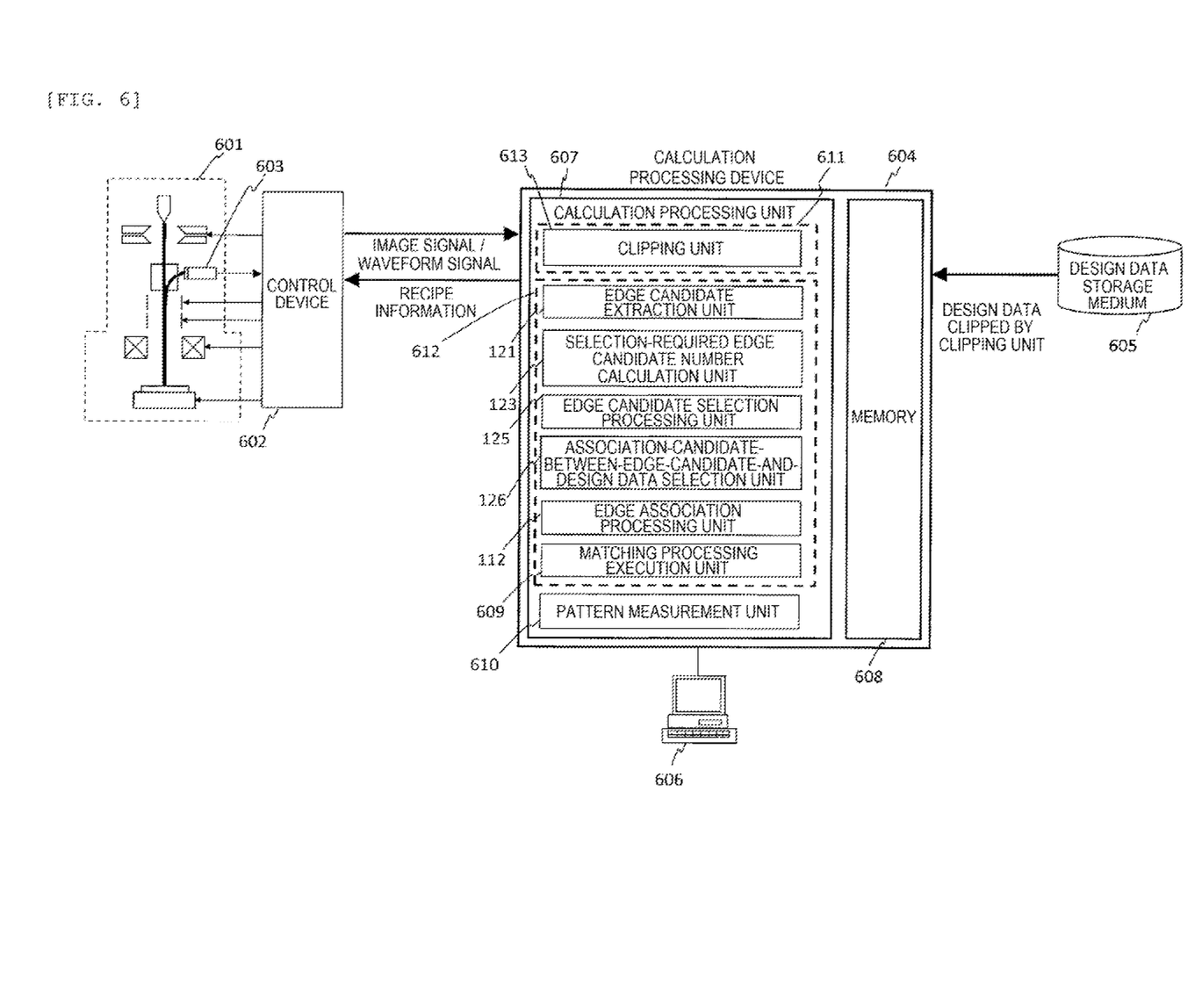
FIG. 6 shows another configuration example of the pattern measuring system of FIG. 4.

FIG. 6 shows another configuration example of the pattern measuring system of FIG. 4. A configuration example of FIG. 6 may be understood as another expression for the same configuration as that of FIG. 4. A pattern measuring system includes an SEM main body 601, a control device 602 for controlling the SEM main body 601, a calculation processing device 604 for executing the pattern matching processing of FIG. 1, a design data storage medium 605 for storing design data, and an input device 606 for inputting required information to the calculation processing device 604.

The calculation processing device 604 includes a calculation unit (for example, a calculation processing unit 607) and a storage unit (for example, a memory 608). Information can be stored in the storage unit, and, for example, a program related to the pattern matching processing is stored.

When the calculation processing unit 607 executes this program, the pattern matching processing shown in FIG. 1 is executed, that is, the calculation processing device 604 functions as the pattern matching apparatus. In other words, the program causes the computer system to function as the calculation processing device 604 in the pattern matching apparatus, and to execute the pattern matching processing shown in FIG. 1.

The calculation processing unit 607 includes a recipe creation unit 611 that sets a condition of a template, a matching processing unit 612 that executes the pattern matching processing based on the set template, and a pattern measurement unit 610 that executes measurement processing of a measurement position specified by the matching processing unit 612.

Secondary electrons and the like obtained by scanning of an electron beam are captured by a detector 603, and an SEM image (corresponding to the SEM image 102 in FIG. 1) is generated based on them. The SEM image is sent to the calculation processing device 604 as an image to be searched for by the matching processing unit 612 and as a signal for measurement by the pattern measurement unit 610.

In the present embodiment, the control device 602 and the calculation processing device 604 are described as separate devices, and these devices may be an integrated control device.

A signal based on the electrons captured by the detector 603 is converted into a digital signal by an A/D converter incorporated in the control device 602. Based on this digital signal, the image processing depending on applications is performed by image processing hardware (CPU, ASIC, FPGA, or the like) incorporated in the calculation processing device 604.

As described above, the calculation processing unit 607 includes the recipe creation unit 611, the matching processing unit 612, and the pattern measurement unit 610. A clipping unit 613 reads the design data from the design data storage medium 605 and performs processing of clipping a portion of the design data. Here, the portion clipped out from the design data is determined based on pattern identification data such as coordinate information set from the input device 606, for example.

Further, the recipe creation unit 611 creates pattern data to be used for matching based on the clipped design data (layout data). The pattern data created here may correspond to the design data 104 of FIG. 1.

Processing in the matching processing unit 612 is as described with reference to FIG. 1. Further, a matching processing execution unit 609 calculates a matching shift amount using a selected association combination. The memory 608 stores the design data, recipe information, image information, measurement results, and the like.

A part or all of the control or processing in the calculation processing device 604 can also be implemented in a CPU, an electronic computer equipped with a memory capable of storing images, or the like.

The input device 606 also functions as an image-capturing recipe creation device and creates an image-capturing recipe. The image-capturing recipe represents a measurement condition, and includes, for example, coordinates of an electronic device, a type of a pattern, and an image-capturing condition (an optical condition or a moving condition of a stage), which are required for measurement and inspection.

In addition, the input device 606 may have a function of collating the input coordinate information and information related to the type of the pattern with layer information of the design data or identification information of the pattern, and reading required information from the design data storage medium 605.

The design data stored in the design data storage medium 605 can be expressed in any format, and can be expressed in a GDS format, an OASIS format, or the like. Appropriate software for displaying the design data can display the design data in various formats of the design data or handle the design data as graphic data. The graphic data may be line segment image information indicating an ideal shape of a pattern formed based on the design data, or may be line segment image information subjected to deformation processing so as to be close to an actual pattern by performing exposure simulation on the line segment image information.

In addition, a program for performing the processing described in FIG. 1 may be registered in a storage medium, and the program may be executed by a control processor having an image memory and supplying a signal required for the scanning electron microscope.

REFERENCE SIGNS LIST

102 SEM image (second pattern data)
104 design data (first pattern data)
107 matching shift amount
108 second edge candidate
109 association candidate
111 association evaluation value
122 primary edge candidate
124 selection-required edge candidate number
130 pattern matching processing unit (computer system)
302 learning model
306 learned model
414 processing/control unit (computer system)
502 learning model
506 learned model
508 estimated addition ratio of edge candidate number (value representing relationship between the number of first edge candidates and selection-required number)
604 calculation processing device (computer system)

The invention claimed is:

1. A pattern matching apparatus comprising:
a computer system configured to execute pattern matching processing between first pattern data based on design data and second pattern data representing a captured image of an electron microscope, wherein
the computer system acquires a first edge candidate group including one or more first edge candidates based on the first pattern data,
the computer system acquires a selection-required number, and the selection-required number represents a number of second edge candidates to be selected based on the second pattern data,
the computer system acquires a second edge candidate group including the second edge candidates of the selection-required number based on the second pattern data,
the computer system acquires an association evaluation value based on the first and second edge candidate groups for each of different association combinations between the first edge candidate group and the second edge candidate group,
the computer system selects one of the combinations based on the association evaluation value, and
the computer system calculates a matching shift amount based on the selected combination, wherein
the computer system includes a learned model,
the learned model receives inputs of the second pattern data and the number of first edge candidates,
the learned model outputs the selection-required number, and
the learned model is learned using training data including a captured image of an electron microscope corresponding to the first pattern data, the number of first edge candidates, and the selection-required number.

2. The pattern matching apparatus according to claim 1, wherein
the computer system determines the selection-required number based on the first pattern data.

3. The pattern matching apparatus according to claim 1, wherein
the computer system acquires primary edge candidates of the selection-required number or more based on the second pattern data,
the computer system calculates an edge evaluation value for each of the primary edge candidates, and
the computer system selects the second edge candidate from the primary edge candidates based on the edge evaluation value.

4. The pattern matching apparatus according to claim 3, wherein
the computer system calculates the edge evaluation value based on luminance in the captured image.

5. The pattern matching apparatus according to claim 4, wherein
the computer system calculates the edge evaluation value based on a waveform of a signal representing the luminance at each position in the captured image.

6. The pattern matching apparatus according to claim 1, wherein
the first pattern data includes information indicating a position of the first edge candidate.

7. The pattern matching apparatus according to claim 1, wherein
the computer system acquires the second edge candidate group by determining a position of each of the second edge candidates.

8. A pattern measuring system comprising:
the pattern matching apparatus according to claim 1; and
a scanning electron microscope.

9. A non-transitory computer-readable medium storing a program instruction to be executed on a computer system, the program instruction causing a computer system to function as the computer system in the pattern matching apparatus according to claim 1.

* * * * *